(12) United States Patent
Liu

(10) Patent No.: US 10,973,054 B2
(45) Date of Patent: Apr. 6, 2021

(54) WIRELESS TRANSCEIVER AND WIRELESS COMMUNICATION METHOD

(71) Applicant: REALTEK SEMICONDUCTOR CORPORATION, Hsinchu (TW)

(72) Inventor: Der-Zheng Liu, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/549,326

(22) Filed: Aug. 23, 2019

(65) Prior Publication Data

US 2020/0100288 A1 Mar. 26, 2020

(30) Foreign Application Priority Data

Sep. 26, 2018 (TW) .................................. 10713388

(51) Int. Cl.
*H04W 74/08* (2009.01)
*H04W 74/00* (2009.01)
(Continued)

(52) U.S. Cl.
CPC ... *H04W 74/0816* (2013.01); *H04W 72/0453* (2013.01); *H04W 74/006* (2013.01); *H04L 5/0007* (2013.01)

(58) Field of Classification Search
CPC ........... H04W 74/0816; H04W 74/006; H04W 72/0453; H04W 28/0236; H04W 36/20;
(Continued)

(56) References Cited

U.S. PATENT DOCUMENTS

| 8,842,647 B2 | 9/2014 | Okuike |
| 8,977,218 B2 | 3/2015 | Yen et al. |

(Continued)

FOREIGN PATENT DOCUMENTS

CN 101784130 A 7/2010

OTHER PUBLICATIONS

IEEE: Expanding the use of CTS-to-Self mechanism for reliable broadcasting on IEEE 802.11 networks. (Year: 2014).*

(Continued)

*Primary Examiner* — Hassan A Phillips
*Assistant Examiner* — Mohammed S Chowdhury
(74) *Attorney, Agent, or Firm* — WPAT, PC

(57) ABSTRACT

Disclosed are a wireless transceiver and a wireless communication method capable of reducing signal interference originated from a neighboring channel, in which the difference between the central frequency of the neighboring channel and the central frequency of a target channel is less than a frequency difference threshold and/or the energy of an interference signal of the neighboring channel is greater than a signal energy threshold. The wireless transceiver includes: a radio-frequency transceiver transmitting a first CTS-to-Self packet via the neighboring channel before it transmits a data packet via the target channel, in which the duration defined by the duration field of the first CTS-to-Self packet includes time for the radio-frequency transceiver finishing transmitting the data packet; a frequency synthesizer providing the signal carriers of the neighboring channel and the target channel for the radio-frequency transceiver; and a radio-frequency controller controlling the frequency synthesizer to provide the signal carriers.

15 Claims, 9 Drawing Sheets

(51) Int. Cl.
*H04W 72/04* (2009.01)
*H04L 5/00* (2006.01)

(58) Field of Classification Search
CPC . H04W 40/16; H04W 52/0238; H04W 52/24; H04W 52/243; H04W 52/244; H04W 72/082; H04W 74/085; H04W 74/0858; H04W 74/0825; H04W 28/0294; H04W 16/14; H04W 72/1215; H04W 72/1278; H04L 5/0007; H04L 12/413; H04L 65/4076

See application file for complete search history.

(56) References Cited

U.S. PATENT DOCUMENTS

| | | | |
|---|---|---|---|
| 9,572,114 B2 | 2/2017 | Chen et al. | |
| 10,498,371 B1* | 12/2019 | Parikh | H04B 1/006 |
| 2006/0146869 A1 | 7/2006 | Zhang et al. | |
| 2012/0108185 A1* | 5/2012 | Yen | H04B 1/0067 |
| | | | 455/90.2 |
| 2015/0131624 A1* | 5/2015 | Merlin | H04W 74/0816 |
| | | | 370/336 |
| 2015/0280777 A1* | 10/2015 | Azizi | H04W 88/06 |
| | | | 370/330 |
| 2015/0304377 A1* | 10/2015 | Chitrakar | H04L 65/4076 |
| | | | 370/312 |
| 2015/0319784 A1* | 11/2015 | Bhushan | H04W 74/0816 |
| | | | 370/329 |
| 2016/0081120 A1* | 3/2016 | Kong | H04W 74/0816 |
| | | | 370/329 |
| 2016/0088659 A1* | 3/2016 | Wu | H04W 74/006 |
| | | | 370/329 |
| 2017/0215081 A1* | 7/2017 | Yi | H04W 74/0816 |
| 2019/0215132 A1* | 7/2019 | Malisetty | H04W 74/0816 |

OTHER PUBLICATIONS

OA letter of counterpart TW application of application No. 107133884 dated Aug. 7, 2019. Summary of the OA letter: claims 1-10 are rejected as being unpatentable over the cited reference 1 (US 2015/0304377 A1) in view of the cited reference 2 (US 2006/0146869 A1).

OA letter of the counterpart CN application (appl. no. 201811148739.1) dated Jan. 22, 2021. Summary of the OA letter: claims 1-2 and 4-10 are rejected as being unpatentable over the cited reference 1 (CN101784130A, also published as JS8842647B2) in view of the common knowledge in this technical field.

* cited by examiner

WIRELESS TRANSCEIVER AND WIRELESS COMMUNICATION METHOD

BACKGROUND OF THE INVENTION

1. Field of the Invention

The present invention relates to wireless communication, especially to a wireless transceiver and wireless communication method capable of reducing signal interference originated from a neighboring channel.

2. Description of Related Art

When a wireless transceiver transmits data packets via a target channel, if another wireless transceiver in the vicinity transmits data packets via the target channel concurrently, packet collision may occur. In order to prevent packet collision, different wireless transceivers in a range should obey the same collision avoidance protocol (e.g., Carrier Sense Multiple Access with Collision Avoidance, CSMA/CA). Under a mechanism of the collision avoidance protocol, a wireless transceiver transmits an RTS (Request to Send) packet to another wireless transceiver (e.g., access point, AP) nearby via the target channel before the transmission of data packets, and after the wireless transceiver receives a CTS (Clear to Send) packet from the another wireless transceiver via the target channel, the wireless transceiver transmits the data packets via the target channel; in the meantime, those wireless transceivers receiving the CTS packet should stop transmission (e.g., adjust their NAV (Network Allocation Vector) values) to prevent packet collision.

Besides, some wireless transceiver (e.g., wireless transceiver only conforming to the 802.11b standard) is incapable of recognizing signals of particular modulation (e.g., Orthogonal frequency-division multiplexing (OFDM) modulation). In order to prevent packet collision with the above-mentioned transceiver, a wireless transceiver (e.g., wireless transceiver conforming to the 802.11g standard) using the particular modulation to transmit data packets via a target channel may transmit the aforementioned RTS packet with an appropriate modulation and then receive the aforementioned CTS packet via the target channel before the wireless transceiver transmits the data packets with the particular modulation, or the wireless transceiver may transmit a CTS-to-Self packet with the appropriate modulation via the target channel before the wireless transceiver transmits the data packets with the particular modulation. Please note that the above-mentioned RTS packet, CTS packet, and CTS-to-Self packet are well known in this technical field, in which the receiver address (RA) of the CTS-to-Self packet is the address of the wireless transceiver sending the CTS-to-Self packet.

Unfortunately, in a circumstance that two channels (e.g., two adjacent channels in the 2.4 GHz frequency band defined by a 802.11 standard) are used for signal transmission concurrently and the difference between the central frequencies of the two channels is not great enough or in a circumstance that the energy of a signal transmitted via a channel is stronger enough to interfere with a signal transmitted via another channel, packet collision still occurs. Since both the aforementioned mechanism using the RTS and CTS packets and mechanism using the CTS-to-Self packet should transmit one or more control packets via a target channel for the prevention of packet collision, when a wireless transceiver using a neighboring channel (e.g., channel 8 of the 2.4 GHZ frequency band defined by a 802.11 standard) close to the target channel (e.g., channel 6 of the 2.4 GHZ frequency band defined by a 802.11 standard) to transmit packets does not receive or can not recognize the CTS packet or the CTS-to-Self packet transmitted via the target channel, the wireless transceiver will continue or start transmitting packets via the neighboring channel and interfere with the signal transmission of the target channel.

SUMMARY OF THE INVENTION

An object of the present invention is to provide a wireless transceiver and wireless communication method for the prevention of the problems of the prior arts.

The wireless transceiver of the present invention can reduce signal interference originated from a neighboring channel, in which the difference between the central frequency of the neighboring channel and the central frequency of a target channel is less than a frequency difference threshold and/or the energy of an interference signal of the neighboring channel is greater than a signal energy threshold. An embodiment of the wireless transceiver includes a radio-frequency (RF) transceiver, a frequency synthesizer, and an RF controller. The RF transceiver is configured to transmit a first CTS-to-Self packet via the neighboring channel before the RF transceiver transmits a data packet via the target channel, in which a duration defined by a duration field of the first CTS-to-Self packet includes time for the RF transceiver finishing transmitting the data packet. The frequency synthesizer is configured to provide a carrier of the neighboring channel and a carrier of the target channel for the RF transceiver. The RF controller is configured to control the frequency synthesizer to provide the carrier of the neighboring channel and the carrier of the target channel.

The wireless communication method of the present invention can reduce signal interference originated from a neighboring channel, in which the difference between the central frequency of the neighboring channel and the central frequency of a target channel is less than a frequency difference threshold and/or the energy of an interference signal of the neighboring channel is greater than a signal energy threshold. An embodiment of the wireless communication method includes the following steps: transmitting a first CTS-to-Self packet via the neighboring channel before a data packet is transmitted via the target channel, in which a duration defined by a duration field of the first CTS-to-Self packet includes time for the data packet to be transmitted successfully; and transmitting the data packet via the target channel.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this technical field. If any term is defined in the following description, such term should be interpreted accordingly.

Figure 1:
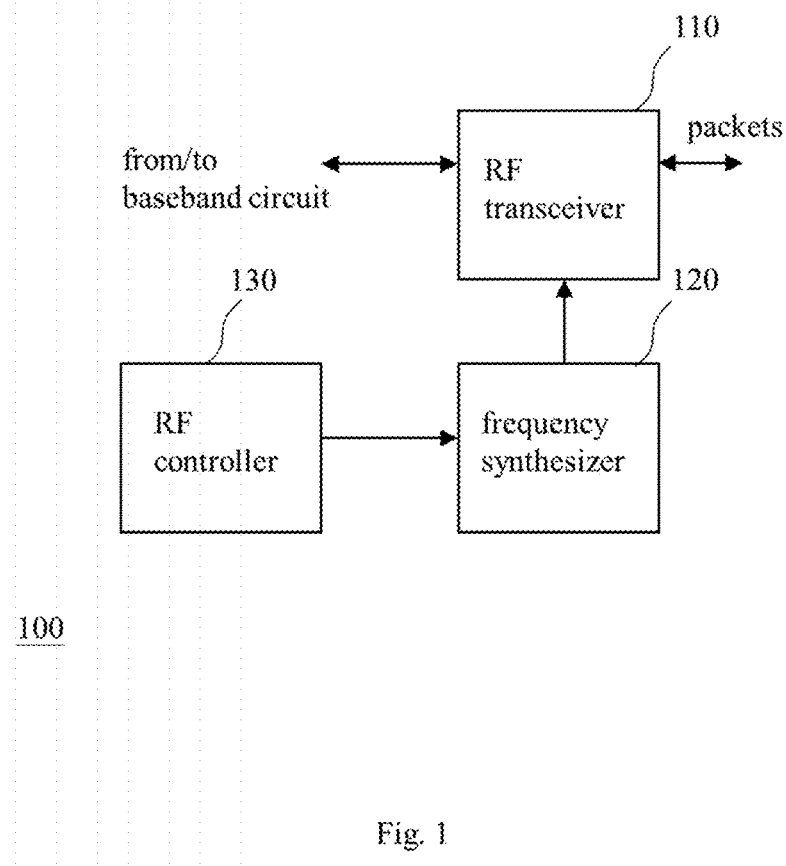
FIG. 1 shows an embodiment of the wireless transceiver of the present invention.

FIG. 1 shows an embodiment of the wireless transceiver of the present invention. The wireless transceiver 100 of FIG. 1 can reduce signal interference originated from a neighboring channel, in which the difference between the central frequency of the neighboring channel and the central frequency of a target channel is less than a frequency difference threshold (e.g., 25 MHz) and/or the energy of an interference signal transmitted via the neighboring channel is greater than a signal energy threshold. The frequency difference threshold and the signal energy threshold can be determined according to the demand for implementation. For instance, according to a 802.11 standard, the difference between the central frequencies of two adjacent channels in the 2.4 GHz frequency band is 5 MHz; on the basis of the above, the neighboring channel and the target channel are the $(N+X)^{th}$ channel and the $N^{th}$ channel in the 2.4 GHz frequency band, in which N is a positive integer, X is an integer (e.g., −5≤X≤5), and (N+X) is not smaller than 1 and not larger than the number of channels in the 2.4 GHz frequency band defined by a 802.11 standard (i.e., channel 1, channel 2, . . . , channel 13, and channel 14 (CH-1, CH2, . . . , CH-13, and CH-14)).

Please refer to FIG. 1. The wireless transceiver 100 includes a radio-frequency (RF) transceiver 110, a frequency synthesizer 120, and an RF controller 130. Please refer to FIG. 1 and FIG. 2; the RF transceiver 110 is coupled to a baseband circuit (not shown in the figures), and the RF transceiver 110 is configured to transmit a first CTS-to-Self packet (hereafter, shifted CTS packet) via the aforementioned neighboring channel (e.g., CH-8) before the RF transceiver 110 transmit a data packet via the aforementioned target channel (e.g., CH-6). The duration defined by the duration field of the shifted CTS packet (hereafter, first duration) includes time for the RF transceiver 110 finishing transmitting the data packet; accordingly, even if the signal interference originated from the neighboring channel (i.e., the block labeled with "Interference" in the figures) exists, the transmission of an interference signal inducing the signal interference will be deferred until the RF transceiver 110 finishes transmitting the data packet; as a result, the transmission of the data packet and the signal interference won't coexist. For instance, the first duration starts as soon as the transmission of the shifted CTS packet is finished, and includes: time for the RF transceiver 110 transmitting one or more control packets, if any, before the RF transceiver finishes receiving an acknowledgement (ACK) packet, time for the RF transceiver 110 transmitting the data packet, time for the RF transceiver 110 receiving the ACK packet, the interframe space (IFS) between every two adjacent control packets, and the IFS between the data packet and the packet adjacent to the data packet. Since using the value of a duration field to represent a duration is common in this technical field and people of ordinary skill in the art can appreciate what kinds of packets are control packets, the detail is omitted here. The frequency synthesizer 120 is configured to provide the carrier (a.k.a. signal carrier or carrier wave) of the neighboring channel and the carrier of the target channel for the RF transceiver 110 while the frequency of the carrier of the neighboring/target channel is the same as the central frequency of the neighboring/target channel; accordingly, the RF transceiver 110 are allowed to use the carrier of the neighboring channel for the transmission of the shifted CTS packet and use the carrier of the target channel for the transmission of the data packet. The RF controller 130 is configured to control the frequency synthesizer 120 to timely provide the carrier of the neighboring channel and the carrier of the target channel for the RF transceiver 110.

Figure 2:
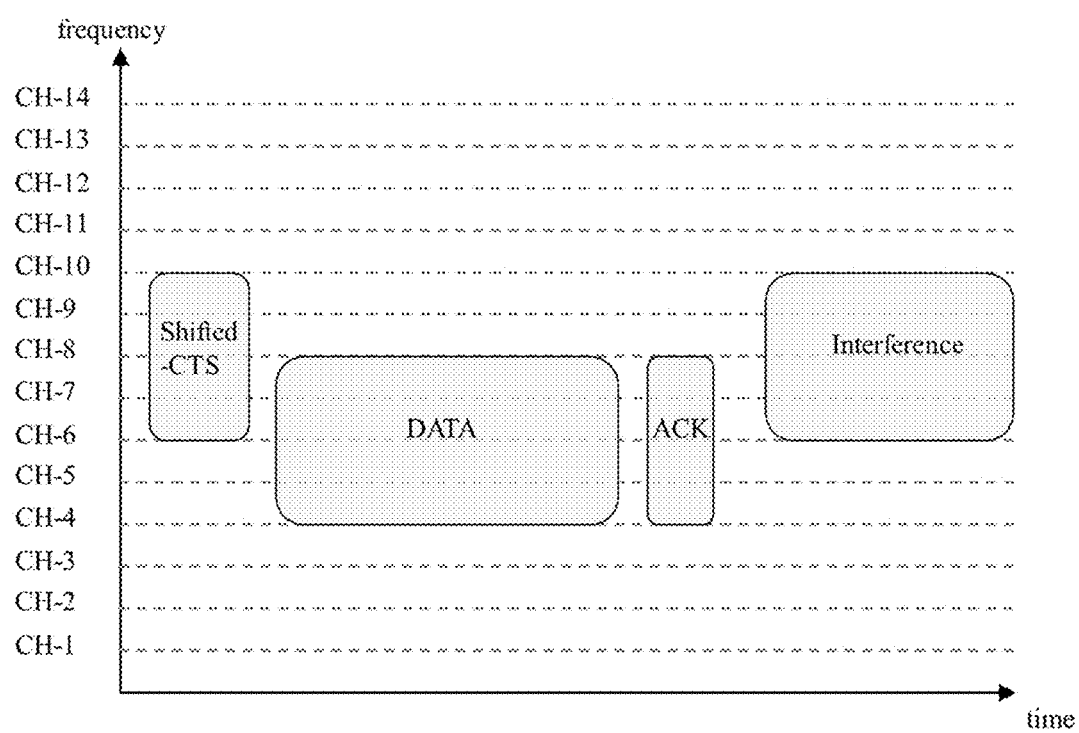
FIG. 2 shows an exemplary operation of the wireless transceiver of FIG. 1 transmitting a shifted CTS packet to prevent interference.
Figure 3:
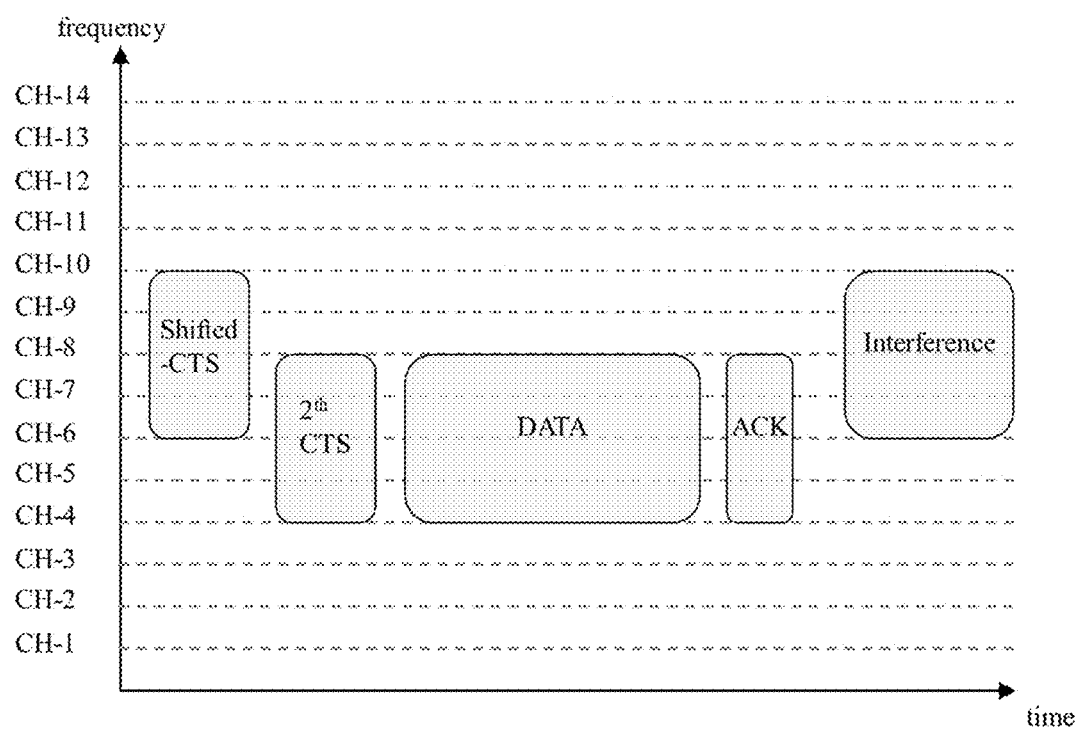
FIG. 3 shows an exemplary operation of the wireless transceiver of FIG. 1 transmitting a shifted CTS packet and a second CTS-to-Self packet to prevent interference.
Figure 4:
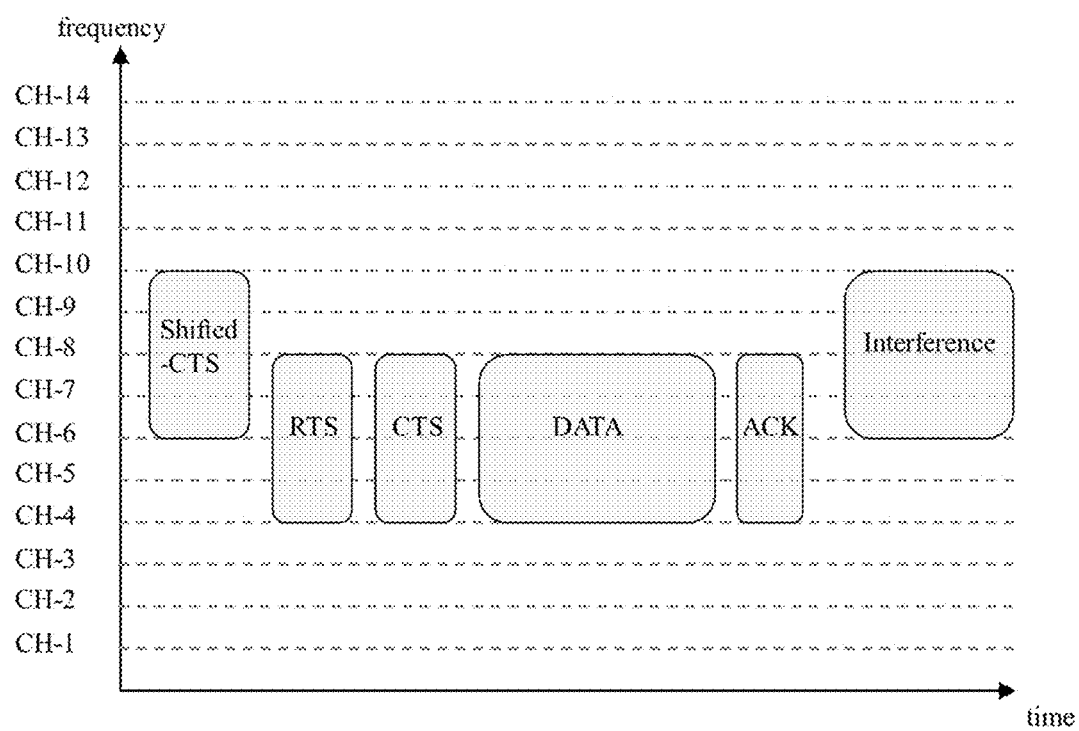
FIG. 4 shows an exemplary operation of the wireless transceiver of FIG. 1 transmitting a shifted CTS packet, transmitting an RTS packet, and receiving a CTS packet to prevent interference.
Figure 5:
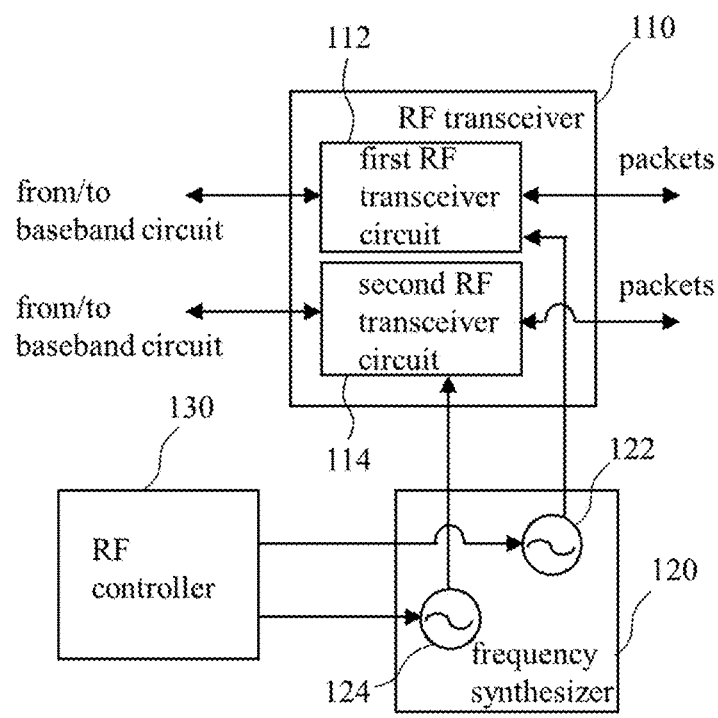
FIG. 5 shows an exemplary implementation of the wireless transceiver of FIG. 1 executing transmission with a plurality of RF transceiver circuits and a plurality of frequency synthesizer circuits.

Please refer to FIGS. 1-2. The RF transceiver 110 reduces the signal interference originated from the neighboring channel by the transmission of the shifted CTS packet; furthermore, if the RF transceiver 110 determines that there exists no effective signal interference in the target channel with a known or self-developed technique (e.g., wireless site survey technique described in the later paragraph and/or power spectrum density (PSD) detection technique), the RF transceiver 100 can directly transmit the data packet via the target channel as soon as the shifted CTS packet is successfully transmitted via the neighboring channel, but if the RF transceiver 110 determines that there exists effective signal interference in the target channel or the RF transceiver 110 wants to ensure that the target channel is clear, the RF transceiver 110 can transmit a second CTS-to-Self (as shown in FIG. 3) via the target channel before the RF transceiver 110 transmits the data packet via the target channel, or the RF transceiver 110 can transmit an RTS (Request to Send) packet and then receive a CTS (Clear to Send) packet (as shown in FIG. 4) via the target channel before the RF transceiver 110 transmits the data packet via the target channel. In an exemplary operation, the RF transceiver 110 transmits one of the shifted CTS packet and the second CTS-to-Self packet first and then transmits the other. In the circumstance that the RF transceiver 110 transmits the shifted CTS packet first, the RF controller 130 is configured to control the frequency synthesizer 120 to provide the carrier of the neighboring channel for the RF transceiver 110 first and then provide the carrier of the target channel for the RF transceiver 110, while the first duration is longer than the duration defined by the duration field of the second CTS-to-Self packet (hereafter, second duration). In the circumstance that the RF transceiver 110 transmits the second CTS-to-Self packet first, the RF controller 130 is configured to control the frequency synthesizer 120 to provide the carrier of the target channel for the RF transceiver 110 first, then provide the carrier of the neighboring channel for the RF transceiver 110, and then provide the carrier of the target channel for the RF transceiver 110 again for the transmission of the data packet, while the second duration is longer than the first duration. In an exemplary operation, the RF transceiver 110 transmits one of the CTS packet and the RTS packet first and then transmits the other; in this instance, the operation of the RF transceiver 110, the frequency synthesizer 120, and the RF controller 130 is similar to the operation of the preceding exemplary operation and the relation between the first duration and the duration defined by the duration field of the RTS packet (hereafter, RTS duration) can be derived according to the description of the preceding exemplary operation. In an exemplary implementation, the wireless transceiver 100 uses a plurality of RF circuits (as shown in FIG. 5) to transmit the shifted CTS packet and one of the second CTS-to-Self packet and the RTS packet concurrently, which is explained in detail in the following paragraph.

Figure 6:
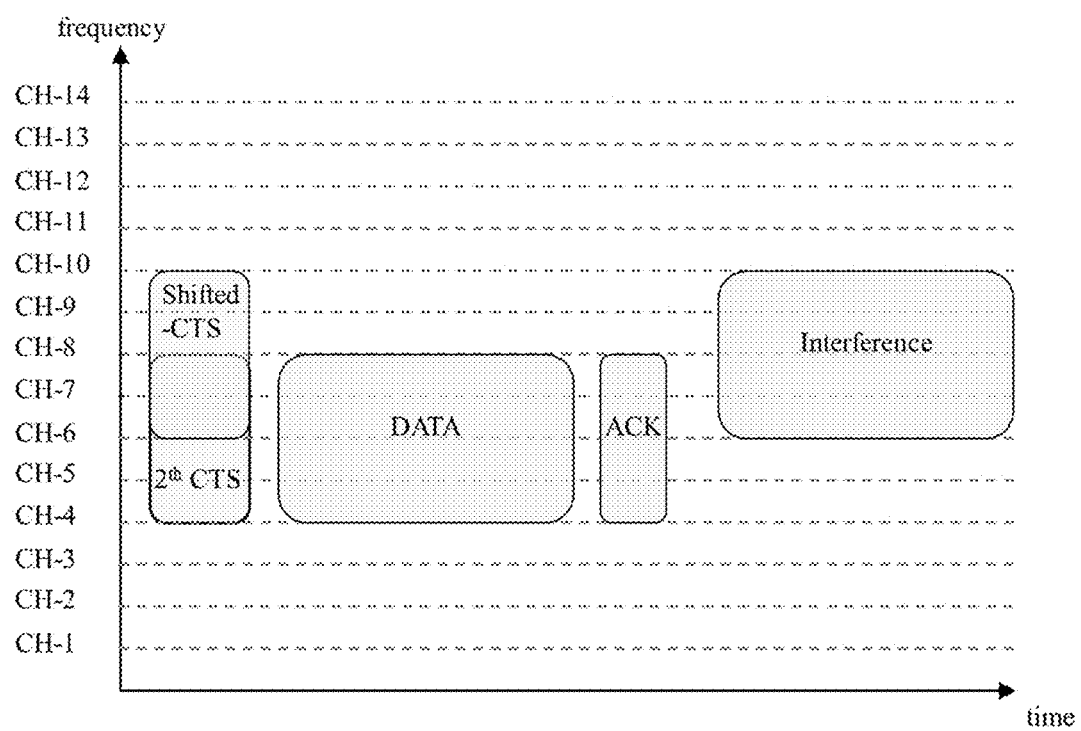
FIG. 6 shows an exemplary operation of the wireless transceiver of FIG. 5 transmitting a shifted CTS packet and a second CTS-to-Self packet concurrently.
Figure 7:
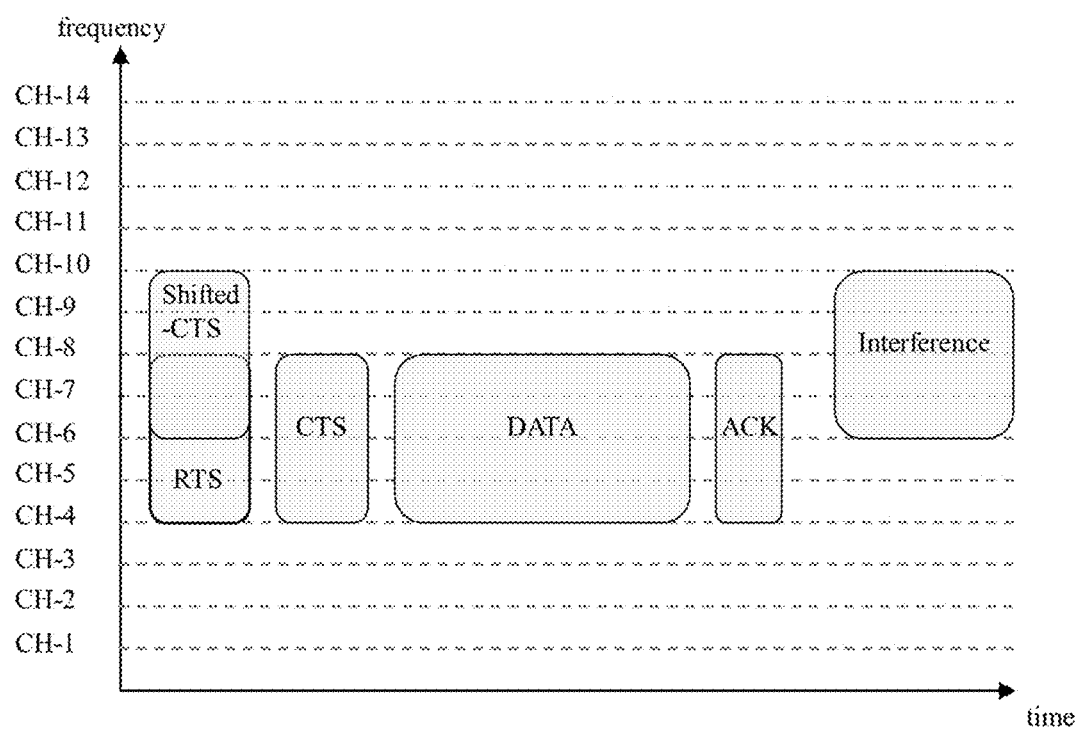
FIG. 7 shows an exemplary operation of the wireless transceiver of FIG. 5 transmitting a shifted CTS packet and an RTS packet concurrently.

Please refer to FIG. 1. The RF transceiver 110 includes one or more RF transceiver circuits and the frequency synthesizer 120 includes one or more frequency synthesizer circuits; accordingly, the wireless transceiver 100 may use a single RF transceiver circuit and a single frequency synthesizer circuit for transmission, or use a plurality of RF transceiver circuits and a plurality of frequency synthesizer circuits for transmission. FIG. 5 shows an exemplary implementation of the wireless transceiver 100 using a plurality of RF transceiver circuits and a plurality of frequency synthesizer circuits for transmission. In FIG. 5 the frequency transceiver 110 includes a first RF transceiver circuit 112 and a second RF transceiver circuit 114 and the frequency synthesizer 120 includes a first frequency synthesizer circuit 122 and a second frequency synthesizer circuit 124. The first RF transceiver circuit 112 is configured to transmit the shifted CTS packet via the neighboring channel, and the second RF transceiver circuit 114 is configured to transmit the second CTS-to-Self packet or the RTS packet via the target channel before the first RF transceiver circuit 112 finishes transmitting the shifted CTS packet. In an exemplary operation, the first RF transceiver circuit 112 and the second RF transceiver circuit 114 substantially transmit the shifted CTS packet and the second CTS-to-Self packet respectively at the same time (as shown in FIG. 6); consequently, the first duration could be equal/similar to the second duration. In an exemplary operation, the first RF transceiver circuit 112 and the second transceiver circuit 114 substantially transmit the shifted CTS packet and the RTS packet respectively at the same time (as shown in FIG. 7); consequently, the first duration could be equal/similar to the RTS duration. The first frequency synthesizer 122 is configured to provide the carrier of the neighboring channel for one of the first RF transceiver circuit 112 and the second RF transceiver circuit 114. In an exemplary implementation, a multiplexer is set between the frequency synthesizer 120 and the RF transceiver 110 so that the multiplexer can control the connection type between the frequency synthesizer 120 (including the plurality of frequency synthesizer circuits) and the RF transceiver 110 (including the plurality of RF transceiver circuits) under the control of the RF transceiver 110. People of ordinary skill in the art can appreciate how to implement the RF transceiver circuits, the frequency synthesizer circuits, and the multiplexer by referring to Applicant's U.S. patent (U.S. Pat. No. 8,977,218).

In a circumstance that the difference between the central frequency of the neighboring channel and the central frequency of the target channel is less than the frequency difference threshold, in order to verify whether the signal interference originated from the neighboring channel exists, the RF transceiver 110 can try to receive a signal (e.g., beacon) transmitted via the neighboring channel to find out whether a wireless device/interference source is using the neighboring channel. If the RF transceiver 110 receives the signal (e.g., beacon) transmitted via the neighboring channel, the existence of the signal interference originated from the neighboring channel can be confirmed; in the meantime, the RF transceiver 110 transmits the shifted CTS packet to temporarily forbid the generation of the signal interference and thereby reduce/eliminate the signal interference of the neighboring channel. If the RF transceiver 110 does not receive the signal (e.g., beacon) transmitted via the neighboring channel, the absence of the signal interference originated from the neighboring channel can be confirmed; in the meantime, the RF transceiver 110 can transmit the data packet via the target channel without the transmission of the shifted CTS packet. Since a known or self-developed technique (e.g., wireless site survey) can be used for verifying whether a wireless device/interference source is using the neighboring channel, the detail is omitted here.

Figure 8:
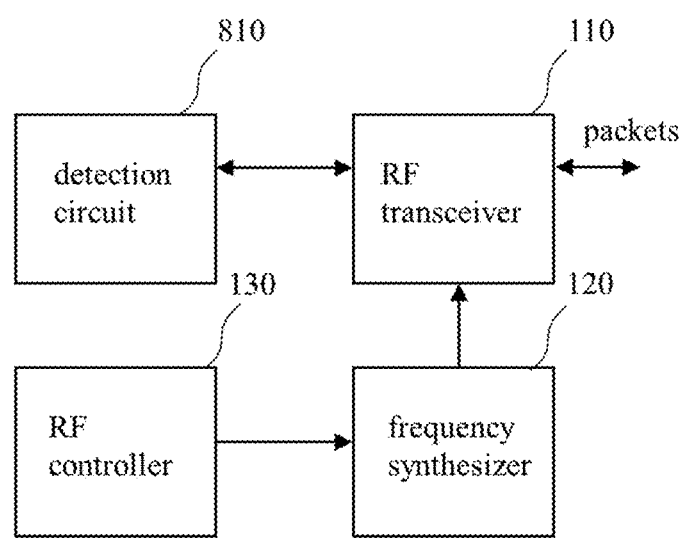
FIG. 8 shows another embodiment of the wireless transceiver of the present invention.

In order to verify whether the energy of an interference signal of the neighboring channel is greater than a signal energy threshold, another embodiment of the wireless transceiver of the present invention is disclosed as shown in FIG. 8. The wireless transceiver 800 of FIG. 8 includes a detection circuit 810. The detection circuit 810 is configured to detect whether the energy of the interference signal originated from the neighboring channel is greater than the signal energy threshold, and if the energy of the interference signal is greater than the signal energy threshold, the detection circuit 810 has the RF transceiver 110 transmit the shifted CTS packet via the neighboring channel. In an exemplary implementation, the detection circuit 810 is a part of a signal processing circuit (not shown in the figures) of the wireless transceiver 800. The detection circuit 810 can be a known or self-developed circuit such as a power spectrum density (PSD) detection circuit. People of ordinary skill in the art can appreciate how to implement the PSD detection circuit by referring to Applicant's U.S. patent (U.S. Pat. No. 9,572,114).

It should be noted that in light of the capabilities of the wireless transceiver of the present invention and the wireless devices in the vicinity of the wireless transceiver and/or in light of the wireless transmission environment, the aforementioned RF transceiver 110 may use the same modulation technique (e.g., non-OFDM modulation technique such as the modulation technique used for the 802.11b standard) for the transmission of the shifted CTS packet and the transmission of the data packet, or the RF transceiver 110 may use a modulation technique (e.g., non-OFDM modulation technique such as the modulation technique used for the 802.11b standard) for the transmission of the shifted CTS packet and use another modulation technique (e.g., OFDM (Orthogonal frequency-division multiplexing) technique) for the transmission of the data packet. The instances of the above-mentioned non-OFDM modulation are as follows: DSSS (direct sequence spread spectrum) modulation, DBPSK (Differential Binary Phase Shift Keying) modulation, DQPSK (Differential Quadrature Phase Shift Keying) modulation, and CCK (Complementary Code Keying) modulation. It should also be noted that the format of the packets mentioned in this specification conforms to the wireless communication standard (e.g., one of the existing 802.11 standards) the wireless transceiver of the present invention adopts, and the detail is omitted here.

Figure 9:
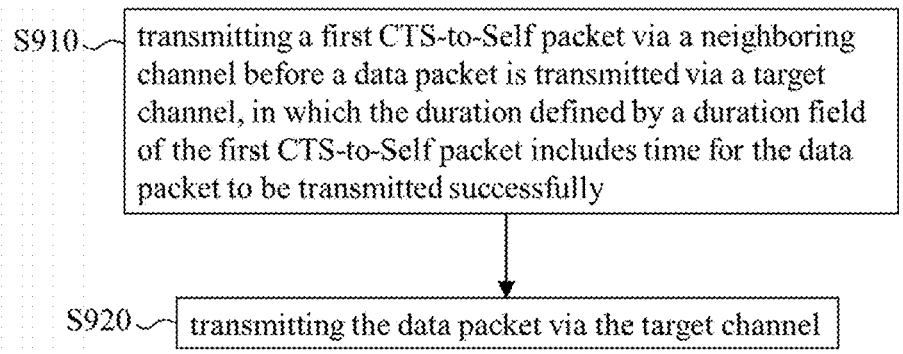
FIG. 9 shows an embodiment of the wireless communication method of the present invention.

FIG. 9 shows the flow chart of an embodiment of the wireless communication method of the present invention. This embodiment can reduce signal interference originated from a neighboring channel, in which the difference between the central frequency of the neighboring channel and the central frequency of a target channel is less than a frequency difference threshold and/or the energy of an interference signal of the neighboring channel is greater than a signal energy threshold. The frequency difference threshold and the signal energy threshold are determined according to the demand for implementation; once the thresholds and the target channel are determined, at least one neighboring channel will be determined. The embodiment of FIG. 9 includes the following steps:

step S910: transmitting a first CTS-to-Self packet via the neighboring channel before a data packet is transmitted via the target channel, in which the duration defined by a duration field of the first CTS-to-Self packet includes time for the data packet to be transmitted successfully; and step S920: transmitting the data packet via the target channel.

Since those of ordinary skill in the art can appreciate the detail and modification of the method embodiment by referring to the disclosure of the aforementioned device embodiments, which implies that the features of the device embodiments can be applied to the method embodiment in a reasonable way, therefore repeated and redundant description is omitted here.

It should be noted that people of ordinary skill in the art can implement the present invention by selectively using some or all of the features of any embodiment in this specification or selectively using some or all of the features of multiple embodiments in this specification as long as such implementation is practicable, which implies that the present invention can be carried out flexibly.

To sum up, the wireless transceiver and wireless communication method of the present invention can reduce signal interference originated from a neighboring channel and thereby increase the success rate of packet transmission.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A wireless transceiver capable of reducing signal interference originated from a neighboring channel, in which the wireless transceiver operates on a target channel for data packet transmission, a difference between a central frequency of the neighboring channel and another central frequency of the target channel is less than a frequency difference threshold and/or an energy of an interference signal of the neighboring channel is greater than a signal energy threshold, the wireless transceiver comprising:
   a radio-frequency (RF) transceiver configured to transmit a first CTS-to-Self packet via the neighboring channel before the RF transceiver transmits a data packet via the target channel, in which a duration defined by a duration field of the first CTS-to-Self packet includes time for the RF transceiver finishing transmitting the data packet;
   a frequency synthesizer configured to provide a carrier wave of the neighboring channel and other carrier wave of the target channel for the RF transceiver; and
   an RF controller configured to control the frequency synthesizer to provide the carrier wave of the neighboring channel, and configured to control the frequency synthesizer to provide the other carrier wave of the target channel;
   wherein the target channel is different from the neighboring channel, and the target channel and the neighboring channel have a same channel bandwidth; the RF transceiver is configured to transmit a second CTS-to-Self packet or an RTS (Request to Send) packet via the target channel before the RF transceiver transmits the data packet via the target channel; the RF transceiver is configured to transmit the second CTS-to-Self packet via the target channel with a step of transmitting a first packet and then transmitting a second packet, the first packet being one of the first CTS-to-Self packet and the second CTS-to-Self packet and the second packet being other one of the first CTS-to-Self packet and the second CTS-to-Self packet; when the RF transceiver is configured to transmit the first CTS-to-Self packet and then transmit the second CTS-to-Self packet in the step, the RF controller is configured to control the frequency synthesizer to provide the carrier wave of the neighboring channel for the RF transceiver and then control the frequency synthesizer to provide the carrier wave of the target channel for the RF transceiver; and when the RF transceiver is configured to transmit the second CTS-to-Self packet and then transmit the first CTS-to-Self packet in the step, the RF controller is configured to control the frequency synthesizer to provide the other carrier wave of the target channel for the RF transceiver and then control the frequency synthesizer to provide the carrier wave of the neighboring channel for the RF transceiver.

2. The wireless transceiver of claim 1, wherein the RF transceiver includes:
   a first RF transceiver circuit configured to transmit the first CTS-to-Self packet via the neighboring channel; and
   a second RF transceiver circuit configured to transmit the second CTS-to-Self packet or the RTS packet via the target channel when the first RF transceiver circuit is transmitting the first CTS-to-Self packet,
   and the frequency synthesizer includes:
   a first frequency synthesizer circuit configured to provide the carrier wave of the neighboring channel for the RF transceiver; and
   a second frequency synthesizer circuit configured to provide the other carrier wave of the target channel for the RF transceiver.

3. The wireless transceiver of claim 1, wherein in a circumstance that the RF transceiver is configured to transmit the RTS packet via the target channel, the RF transceiver is configured to receive a CTS (Clear to Send) packet via the target channel before the RF transceiver transmits the data packet via the target channel.

4. The wireless transceiver of claim 3, wherein the duration defined by the duration field of the first CTS-to-Send packet is longer than a second duration defined by a second duration field of the RTS packet.

5. A wireless transceiver capable of reducing signal interference originated from a neighboring channel, in which the wireless transceiver operates on a target channel for data packet transmission, a difference between a central frequency of the neighboring channel and another central frequency of the target channel is less than a frequency difference threshold and/or an energy of an interference signal of the neighboring channel is greater than a signal energy threshold, the wireless transceiver comprising:
   a radio-frequency (RF) transceiver configured to transmit a first CTS-to-Self packet via the neighboring channel before the RF transceiver transmits a data packet via the target channel, in which a duration defined by a duration field of the first CTS-to-Self packet includes time for the RF transceiver finishing transmitting the data packet;

a frequency synthesizer configured to provide a carrier wave of the neighboring channel and other carrier wave of the target channel for the RF transceiver; and an RF controller configured to control the frequency synthesizer to provide the carrier wave of the neighboring channel, and configured to control the frequency synthesizer to provide the other carrier wave of the target channel;

wherein the target channel is different from the neighboring channel, and the target channel and the neighboring channel have a same channel bandwidth; the RF transceiver is configured to transmit a second CTS-to-Self packet or an RTS (Request to Send) packet via the target channel before the RF transceiver transmits the data packet via the target channel; and in a circumstance that the RF transceiver is configured to transmit the second CTS-to-Self via the target channel, the duration of the duration field of the first CTS-to-Self packet is longer than a third duration of a third duration field of the second CTS-to-Self packet.

6. The wireless transceiver of claim 1, wherein in a circumstance that the difference between the central frequency of the neighboring channel and the another central frequency of the target channel is less than the frequency difference threshold, the RF transceiver verifies that the signal interference originated from the neighboring channel exists according to a signal of the neighboring channel and then the RF transceiver transmits the first CTS-to-Self packet.

7. The wireless transceiver of claim 1, further including:
a detection circuit configured to detect whether the energy of the interference signal of the neighboring channel is greater than the signal energy threshold, and the detection circuit configured to have the RF transceiver transmit the first CTS-to-Self packet via the neighboring channel when the energy of the interference signal is greater than the signal energy threshold.

8. The wireless transceiver of claim 7, wherein the detection circuit is a power spectrum density (PSD) detection circuit.

9. The wireless transceiver of claim 1, wherein the RF transceiver is configured to transmit the data packet with Orthogonal Frequency-Division Multiplexing (OFDM) modulation and transmit the first CTS-to-Self packet with non-OFDM modulation.

10. A wireless communication method capable of reducing signal interference originated from a neighboring channel, in which a difference between a central frequency of the neighboring channel and another central frequency of a target channel is less than a frequency difference threshold and/or an energy of an interference signal of the neighboring channel is greater than a signal energy threshold, the wireless communication method comprising following steps:

transmitting a first CTS-to-Self packet via the neighboring channel before a data packet is transmitted via the target channel, in which a duration defined by a duration field of the first CTS-to-Self packet includes time for the data packet to be transmitted successfully;

transmitting a second CTS-to-Self packet or an RTS (Request to Send) packet via the target channel before the data packet is transmitted via the target channel; in a circumstance that the RTS packet is transmitted via the target channel, receiving a CTS (Clear to Send) packet via the target channel before the data packet is transmitted via the target channel, wherein the duration defined by the duration field of the first CTS-to-Self packet is longer than a second duration defined by a second duration field of the CTS packet; and transmitting the data packet via the target channel;
wherein the target channel is different from the neighboring channel, and the target channel and the neighboring channel have a same channel bandwidth.

11. The wireless communication method of claim 10, wherein the second CTS-to-Self packet is transmitted via the target channel with a step of transmitting a first packet and then transmitting a second packet, the first packet being one of the first CTS-to-Self packet and the second CTS-to-Self packet and the second packet being other one of the first CTS-to-Self packet and the second CTS-to-Self packet.

12. The wireless communication method of claim 10, wherein when the first CTS-to-Self packet is being transmitted, a process for transmitting the second CTS-to-Self packet or the RTS packet via the target channel is in progress.

13. The wireless communication method of claim 10, wherein in a circumstance that the second CTS-to-Self packet is transmitted via the target channel, the duration defined by the duration field of the first CTS-to-Self packet is longer than a third duration of a third duration field defined by the second CTS-to-Self packet.

14. The wireless communication method of claim 10, further comprising: in a circumstance that the difference between the central frequency of the neighboring channel and the central frequency of the target channel is less than the frequency difference threshold, receiving a signal of the neighboring channel for determining that the signal interference originated from the neighboring channel exists and then transmitting the first CTS-to-Self packet.

15. The wireless communication method of claim 10, further comprising:
detecting whether the energy of the interference signal of the neighboring channel is greater than the signal energy threshold; and
when the energy of the interference signal is greater than the signal energy threshold, transmitting the first CTS-to-Self packet.

* * * * *